(12) United States Patent
Taibi et al.

(10) Patent No.: US 11,076,162 B2
(45) Date of Patent: Jul. 27, 2021

(54) METHOD AND NETWORK EQUIPMENT FOR ENCODING AN IMMERSIVE VIDEO SPATIALLY TILED WITH A SET OF TILES

(71) Applicant: InterDigital CE Patent Holdings, Paris (FR)

(72) Inventors: Charline Taibi, Chartres de Bretagne (FR); Frederique Humbert, Rennes (FR); Remi Houdaille, Cesson Sevigne (FR)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 16/285,978

(22) Filed: Feb. 26, 2019

(65) Prior Publication Data

US 2019/0268607 A1   Aug. 29, 2019

(30) Foreign Application Priority Data

Feb. 26, 2018   (EP) ..................... 18305197

(51) Int. Cl.
| | |
|---|---|
| *H04N 19/167* | (2014.01) |
| *H04N 19/90* | (2014.01) |
| *G06K 9/32* | (2006.01) |
| *G06K 9/62* | (2006.01) |
| *H04N 21/845* | (2011.01) |
| *H04N 21/81* | (2011.01) |
| *H04N 21/2343* | (2011.01) |

(52) U.S. Cl.
CPC ......... *H04N 19/167* (2014.11); *G06K 9/3233* (2013.01); *G06K 9/6201* (2013.01); *H04N 19/90* (2014.11); *H04N 21/23439* (2013.01); *H04N 21/234345* (2013.01); *H04N 21/816* (2013.01); *H04N 21/8456* (2013.01)

(58) Field of Classification Search
CPC ......... H04N 19/167; H04N 21/234345; H04N 21/23439; H04N 21/816; H04N 21/8456; H04N 19/90; G06K 9/6201; G06K 9/3233
See application file for complete search history.

(56) References Cited

U.S. PATENT DOCUMENTS

| | | | |
|---|---|---|---|
| 6,466,254 B1 * | 10/2002 | Furlan ............ | H04N 21/234345 348/36 |
| 2015/0032901 A1 * | 1/2015 | Wang .................. | H04L 65/4092 709/231 |

(Continued)

FOREIGN PATENT DOCUMENTS

| | | |
|---|---|---|
| EP | 1162830 | 12/2001 |
| EP | 1162830 A3 | 8/2003 |

(Continued)

OTHER PUBLICATIONS

Gaddam et al., "Tiling in Interactive Panoramic Video: Approaches and Evaluation", IEEE Transactions on Multimedia, vol. 18, No. 9, Sep. 2016, pp. 1819-1831.

(Continued)

*Primary Examiner* — Joseph W Becker
(74) *Attorney, Agent, or Firm* — Invention Mine LLC

(57) ABSTRACT

An encoder is configured for encoding an immersive video spatially tiled with a set of tiles in one or more representations in accordance with corresponding assigned bit-rate upper limits depending on obtained proximity values of the corresponding tiles.

20 Claims, 5 Drawing Sheets

(56) References Cited

U.S. PATENT DOCUMENTS

| | | | | |
|---|---|---|---|---|
| 2016/0007026 | A1* | 1/2016 | Dong | H04N 5/23212 |
| | | | | 375/240.08 |
| 2017/0237983 | A1* | 8/2017 | Adsumilli | H04N 19/167 |
| | | | | 375/240.03 |
| 2017/0374411 | A1* | 12/2017 | Lederer | H04N 21/8456 |
| 2019/0238861 | A1* | 8/2019 | D'Acunto | H04N 21/21805 |
| 2019/0268607 | A1* | 8/2019 | Taibi | G06K 9/3233 |
| 2020/0053435 | A1* | 2/2020 | Denoual | H04N 21/8456 |

FOREIGN PATENT DOCUMENTS

| | | |
|---|---|---|
| WO | WO2017127816 | 7/2017 |
| WO | WO2017202899 | 11/2017 |

OTHER PUBLICATIONS

Hosseini et al., "Adaptive 360 VR Video Streaming: Divide and Conquer!", 2016 IEEE International Symposium on Multimedia (ISM), San Jose, California, USA, Dec. 11, 2016, pp. 107-110.
Sanchez De La Fuente et al., "Video Processing for Panoramic Streaming using HEVC and its Scalable Extensions", Multimedia Tools and Applications, vol. 76, No. 4, Feb. 2017, pp. 5631-5659.
Chang et al., "Adaptive Region of Interest Processing for Panoramic System", 2017 IEEE International Conference on Multimedia and Expo: Workshops (ICMEW), Hong Kong, Jul. 10, 2017, pp. 351-356.

* cited by examiner

METHOD AND NETWORK EQUIPMENT FOR ENCODING AN IMMERSIVE VIDEO SPATIALLY TILED WITH A SET OF TILES

REFERENCE TO RELATED EUROPEAN APPLICATION

This application claims priority from European Patent Application No. 18305197.8, entitled "METHOD AND NETWORK EQUIPMENT FOR ENCODING AN IMMERSIVE VIDEO SPATIALLY TILED WITH A SET OF TILES", filed on Feb. 26, 2018, the contents of which are hereby incorporated by reference in its entirety.

TECHNICAL FIELD

The present disclosure relates generally to the streaming of immersive videos (such as spherical videos, so called Virtual Reality (VR) 360° videos, or panoramic videos) to an end device through a delivery network.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Spherical videos offer an immersive experience wherein a user can look around using a VR head-mounted display (HMD) or can navigate freely within a scene on a flat display by controlling the viewport with a controlling apparatus (such as a mouse or a remote control).

Such a freedom in spatial navigation requires that the whole 360° scene is delivered to a player (embedded within the HMD or TV set) configured to extract the video portion to be visualized depending on the position of the observer's aiming point within the scene. In such a situation, a high throughput is necessary to deliver the video. Indeed, it is commonly admitted that a physical space field of vision surrounded by the 360° horizontal direction and 180° vertical direction can be entirely covered by an observer within a minimum set of twelve viewports. To offer an unrestricted spherical video service in 4K resolution, a video stream equivalent to twelve 4K videos has to be provided.

Therefore, one main issue relies on the efficient transmission of spherical videos over bandwidth constrained network with an acceptable quality of immersive experience (i.e. avoiding freeze screen, blockiness, black screen, etc.). Currently, for delivering a spherical video service in streaming, a compromise has to be reached between immersive experience, resolution of video and available throughput of the content delivery network.

The majority of known solutions streaming spherical videos provides the full 360° scene to the end device, but only less than 10% of the whole scene is presented to the user. Since delivery networks have limited throughput, the video resolution is decreased to meet bandwidth constraints.

Other known solutions mitigate the degradation of the video quality by reducing the resolution of the portion of the 360° scene arranged outside of the current viewport of the end device. Nevertheless, when the viewport of the end device is moved upon user's action to a lower resolution area, the displayed video suffers from a sudden degradation.

Besides, when the targeted usage requires that the displayed video is always at the best quality, it prevents from using solutions based on a transitional degradation of resolution when the user's aiming point is varying. Consequently, the delivered video must cover a part of the scene large enough to allow the user to pan without risking a disastrous black area display due to a lack of video data. This part of the scene can for instance include the area which is currently viewed (i.e. the viewport or aiming point) and the surrounding region to prevent quality degradation when the user moves its viewport. This can be achieved by dividing the scene of spherical video into a set of tiles from which only a relevant subset of tiles (comprising the viewport and its surrounding) is delivered to a player.

The delivery transport protocol being generally adaptive streaming, the available scene can be changed only with a periodicity of the segment duration.

The present disclosure has been devised with the foregoing in mind.

SUMMARY

The present principles concern a method for encoding, at an encoder, an immersive video spatially tiled with a set of tiles in one or more representations, a tile covering a portion of a scene of the immersive video, said immersive video being temporally divided into a plurality of video segments, a video segment being further defined by a plurality of tile segments, a tile segment being associated with a tile of the set of tiles, said method comprising:
  obtaining, for each time section among a set of time sections temporally dividing the immersive video, proximity values associated with the tiles representing a proximity of the tiles with respect to a region of interest of the scene,
  encoding, for each time section, the tiles of the set of tiles according to one or more representations in accordance with corresponding assigned bit-rate upper limits depending on the obtained proximity values of the corresponding tiles.

In an embodiment of the present principles, the proximity of a given tile with respect to a region of interest of the scene can correspond to a number of tiles between the given tile and the region of interest.

In an embodiment of the present principles, the proximity of a given tile with respect to a region of interest of the scene can correspond to a distance between a center of the given tile and a center of the region of interest.

In an embodiment of the present principles, when at least two regions of interest are present in the scene for a given time section, a proximity value assigned to a tile can be obtained from the closest region of interest with respect to the tile.

In an embodiment of the present principles, each bit-rate upper limit assigned to a proximity value of a tile can correspond to a maximum encoding video quality allowed for the tile.

In an embodiment of the present principles, the method can further comprise determining a linking path between two regions of interest and assigning a defined proximity value to the tiles on the linking path.

The present principles also concern an encoder configured for encoding an immersive video spatially tiled with a set of tiles in one or more representations, a tile covering a portion of a scene of the immersive video, said immersive video being temporally divided into a plurality of video segments, a video segment being further defined by a plurality of tile segments, a tile segment being associated with a tile of the set of tiles. Said encoder comprises one or more memories and one or more processors configured for:

obtaining, for each time section among a set of time sections temporally dividing the immersive video, proximity values associated with the tiles representing a proximity of the tiles with respect to a region of interest of the scene, encoding, for each time section, the tiles of the set of tiles according to one or more representations in accordance with corresponding assigned bit-rate upper limits depending on the obtained proximity values of the corresponding tiles.

In an embodiment of the present principles, the proximity of a given tile with respect to a region of interest of the scene can correspond to a number of tiles between the given tile and the region of interest.

In an embodiment of the present principles, the proximity of a given tile with respect to a region of interest of the scene can correspond to a distance between a center of the given tile and a center of the region of interest.

In an embodiment of the present principles, each bit-rate upper limit assigned to a proximity value of a tile can correspond to a maximum encoding video quality allowed for the tile.

In an embodiment of the present principles, the one or more processors can be further configured for determining a linking path between two regions of interest and for assigning a defined proximity value to the tiles on the linking path.

The present principles are also directed to a method for receiving, at a terminal, an immersive video spatially tiled with a set of tiles in one or more representations, a tile covering a portion of a scene of the immersive video, said immersive video being temporally divided into a plurality of video segments, a video segment being further defined by a plurality of tile segments, a tile segment being associated with a tile of the set of tiles, said method comprising:

receiving, from a network equipment, a media presentation description file associated with the immersive video, describing available representations of tile segments for a set of time sections temporally dividing the immersive video encoded according to a method as previously described.

The present principles further concern a terminal configured for receiving, from a network equipment, an immersive video spatially tiled with a set of tiles in one or more representations, a tile covering a portion of a scene of the immersive video, said immersive video being temporally divided into a plurality of video segments, a video segment being further defined by a plurality of tile segments, a tile segment being associated with a tile of the set of tiles, said terminal comprising at least one interface of connection for receiving a media presentation description file associated with the immersive video, describing available representations of tile segments for a set of time sections temporally dividing the immersive video encoded according to a method as previously described.

Besides, the present principles are further directed to a computer program product at least one of downloadable from a communication network and recorded on a non-transitory computer readable medium readable by at least one of computer and executable by a processor, comprising program code instructions for implementing a method for encoding, at an encoder, an immersive video spatially tiled with a set of tiles in one or more representations, a tile covering a portion of a scene of the immersive video, said immersive video being temporally divided into a plurality of video segments, a video segment being further defined by a plurality of tile segments, a tile segment being associated with a tile of the set of tiles, said method comprising:

obtaining, for each time section among a set of time sections temporally dividing the immersive video, proximity values associated with the tiles representing a proximity of the tiles with respect to a region of interest of the scene, encoding, for each time section, the tiles of the set of tiles according to one or more representations in accordance with corresponding assigned bit-rate upper limits depending on the obtained proximity values of the corresponding tiles.

The present principles also concern a non-transitory program storage device, readable by a computer, tangibly embodying a program of instructions executable by the computer to perform a method for encoding, at an encoder, an immersive video spatially tiled with a set of tiles in one or more representations, a tile covering a portion of a scene of the immersive video, said immersive video being temporally divided into a plurality of video segments, a video segment being further defined by a plurality of tile segments, a tile segment being associated with a tile of the set of tiles, said method comprising:

obtaining, for each time section among a set of time sections temporally dividing the immersive video, proximity values associated with the tiles representing a proximity of the tiles with respect to a region of interest of the scene, encoding, for each time section, the tiles of the set of tiles according to one or more representations in accordance with corresponding assigned bit-rate upper limits depending on the obtained proximity values of the corresponding tiles.

The method according to the disclosure may be implemented in software on a programmable apparatus. It may be implemented solely in hardware or in software, or in a combination thereof.

Some processes implemented by elements of the present disclosure may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements of the present disclosure can be implemented in software, the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like.

The disclosure thus provides a computer-readable program comprising computer-executable instructions to enable a computer to perform the method for tiling with a set of tiles a sphere representing a spherical multimedia content according to the disclosure.

Certain aspects commensurate in scope with the disclosed embodiments are set forth below. It should be understood that these aspects are presented merely to provide the reader with a brief summary of certain forms the disclosure might take and that these aspects are not intended to limit the scope of the disclosure. Indeed, the disclosure may encompass a variety of aspects that may not be set forth below.

BRIEF DESCRIPTION OF THE DRAWINGS

The disclosure will be better understood and illustrated by means of the following embodiment and execution examples, in no way limitative, with reference to the appended figures on which.

Wherever possible, the same reference numerals will be used throughout the figures to refer to the same or like parts.

DETAILED DESCRIPTION

Figure 1:
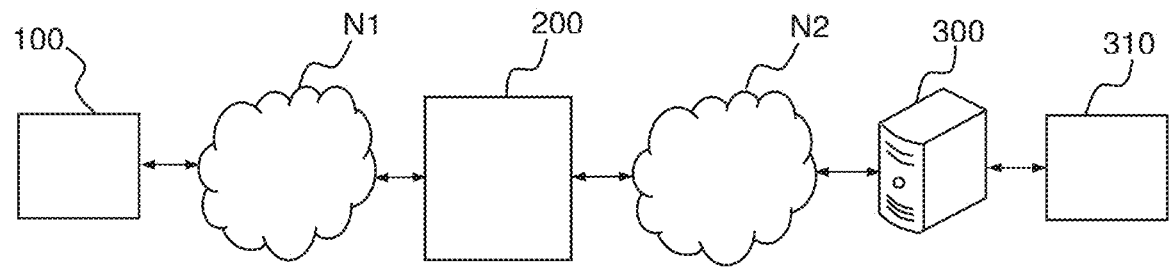
FIG. 1 is a schematic diagram of an exemplary network architecture wherein the present principles might be implemented.

The following description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the present principles and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

In the claims hereof, any element expressed as a means and/or module for performing a specified function is intended to encompass any way of performing that function including, for example, a) a combination of circuit elements that performs that function or b) software in any form, including, therefore, firmware, microcode or the like, combined with appropriate circuitry for executing that software to perform the function. It is thus regarded that any means that can provide those functionalities are equivalent to those shown herein.

In addition, it is to be understood that the figures and descriptions of the present disclosure have been simplified to illustrate elements that are relevant for a clear understanding of the present disclosure, while eliminating, for purposes of clarity, many other elements found in typical digital multimedia content delivery methods, devices and systems. However, because such elements are well known in the art, a detailed discussion of such elements is not provided herein. The disclosure herein is directed to all such variations and modifications known to those skilled in the art.

The present principles are depicted with regard to a streaming environment to deliver an immersive video (such as a spherical video or a panoramic video) to a client terminal through a delivery network.

As shown in the example of FIG. 1, the Client-Server network architecture, wherein the present principles might be implemented, comprises a client terminal 100, gateway 200, one or more network equipment 300 (only one is represented in FIG. 1), such as content servers, and an encoder apparatus 310 providing encoded immersive videos.

The client terminal 100—connected to the gateway 200 through a first network N1 (such as a home network or an enterprise network)—may wish to request an immersive video stored on a network equipment 300 (e.g. a content server) through a second network N2 (such as the Internet network). The first network N1 is connected to the second network N2 thanks to the gateway 200. The server 300 is further connected to the encoder apparatus 310.

The server 300 is configured to stream segments of the immersive video to the client terminal 100, upon the client request, using a streaming protocol. In the following, as an illustrative but non-limitative example, adaptive streaming (such as the HTTP adaptive streaming protocol, so called HAS, like MPEG-DASH or HTTP Live Streaming (HLS)) is considered to deliver the immersive video to the client terminal 100 from the server 300.

Figure 2:
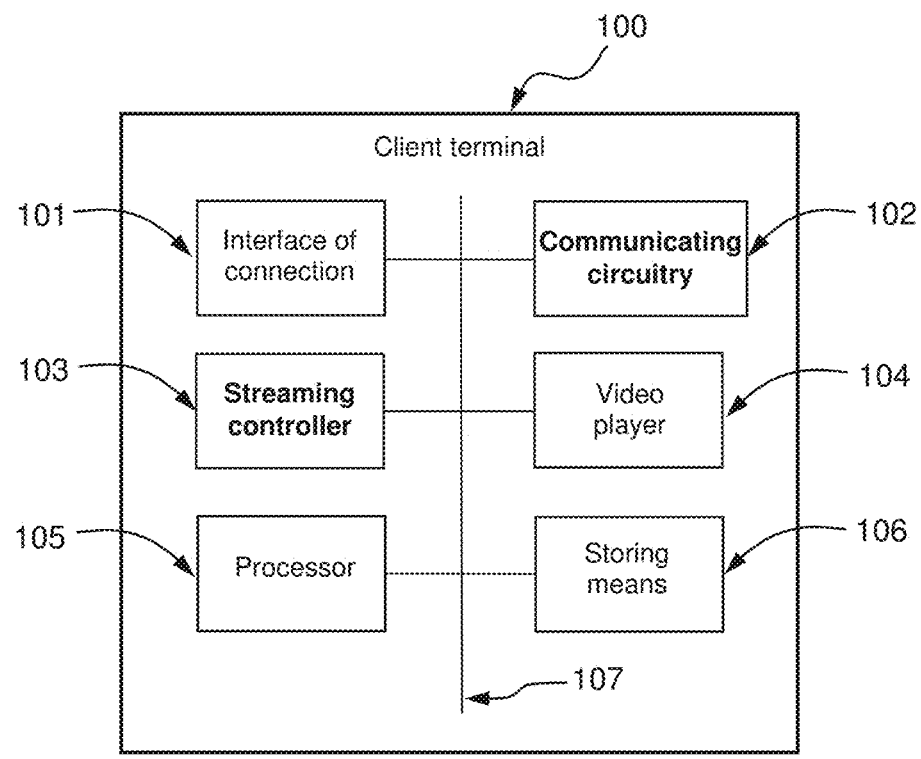
FIG. 2 is a schematic block diagram of an exemplary client terminal compliant with the present principles might be implemented.

As shown in the example of FIG. 2, the client terminal 100 can comprise at least:
- an interface of connection 101 (wired and/or wireless, as for example Wi-Fi, Ethernet, etc.) to the first network N1;
- a communication circuitry 102 containing the protocol stacks to communicate with the server 300. In particular, the communication module 102 comprises the TCP/IP stack well known in the art. Of course, it could be any other type of network and/or communicating means enabling the client terminal 100 to communicate with the server 300;
- a streaming controller 103 which receives the immersive video from the server 300;
- a video player 104 adapted to decode and render the encoded immersive video;
- one or more processor(s) 105 for executing the applications and programs stored in a non-volatile memory of the client terminal 100;
- storing means 106, such as a volatile memory, for buffering the segments received from the server 300 before their transmission to the video player 104;
- an internal bus 107 to connect the various modules and all means well known to the skilled in the art for performing the generic client terminal functionalities.

As an example, the client terminal 100 is a portable media device, a mobile phone, a tablet or a laptop, a head mounted device, a TV set, a set-top box or the like. Naturally, the client terminal 100 might not comprise a complete video player, but only some sub-elements such as the ones for demultiplexing and decoding the media content and might rely upon an external means to display the decoded content to the end user.

Figure 3A:
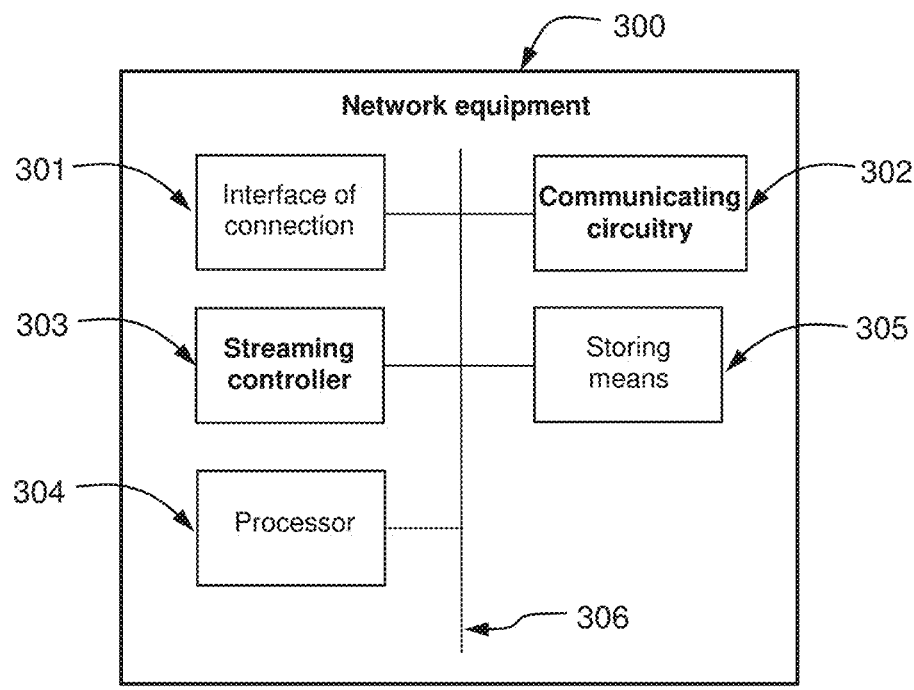
FIGS. 3A and 3B are schematic block diagrams of, respectively, an exemplary network equipment and an exemplary network encoder wherein the present principles may be implemented.

As shown in the example of FIG. 3A, the server 300 can comprise at least:
- an interface of connection 301 (wired and/or wireless) to the second network N2;
- a communication circuitry 302 to deliver data to one or several requesting terminals. In particular, the communication circuitry 302 can comprise the TCP/IP stack well known in the art. Of course, it could be any other type of network and/or communicating means enabling the server 300 to communicate with a client terminal 100;
- a streaming controller 303 configured to deliver the immersive video to one or several client terminals;
- one or more processor(s) 304 for executing the applications and programs stored in a non-volatile memory of the server 300;
- storing means 305;
- an internal bus 306 to connect the various modules and all means well known to the skilled in the art for performing the generic server functionalities.

Figure 3B:
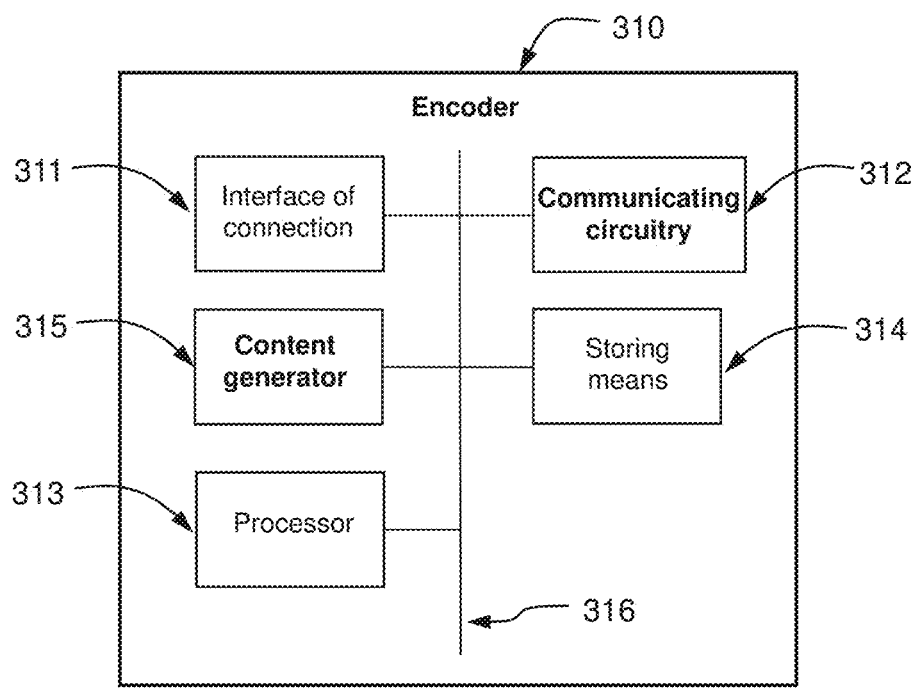

As shown in the example of FIG. 3B, the encoder apparatus 310 can comprise at least:
- an interface of connection 311 (wired and/or wireless) to the second network N2;
- a communication circuitry 312 to deliver encoded data to one or several content servers 300. In particular, the communication circuitry 312 can comprise the TCP/IP stack well known in the art. Of course, it could be any other type of network and/or communicating means enabling the encoder apparatus 310 to communicate with server 300;
- one or more processor(s) 313 for executing the applications and programs stored in a non-volatile memory of the encoder 310;
- storing means 314;
- a content generator 315 configured to generate and format the immersive video content. When encoded, the immersive video content stored in the storing means 314 can be forwarded to the content server 300;
- an internal bus 316 to connect the various modules and all means well known to the skilled in the art for performing the generic functionalities of the encoder.

In a variant or complement, the encoder 310 may be embedded within the server 300 to form a single device.

Figure 4:
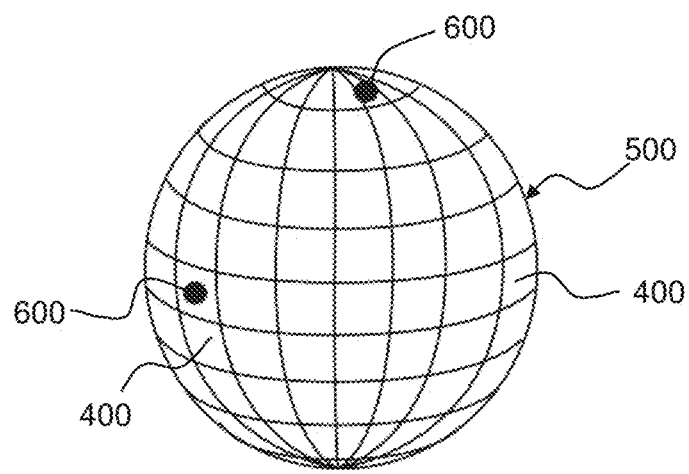
FIG. 4 depicts an exemplary tiling of a scene of a spherical video compliant with the present principles.
Figure 5:
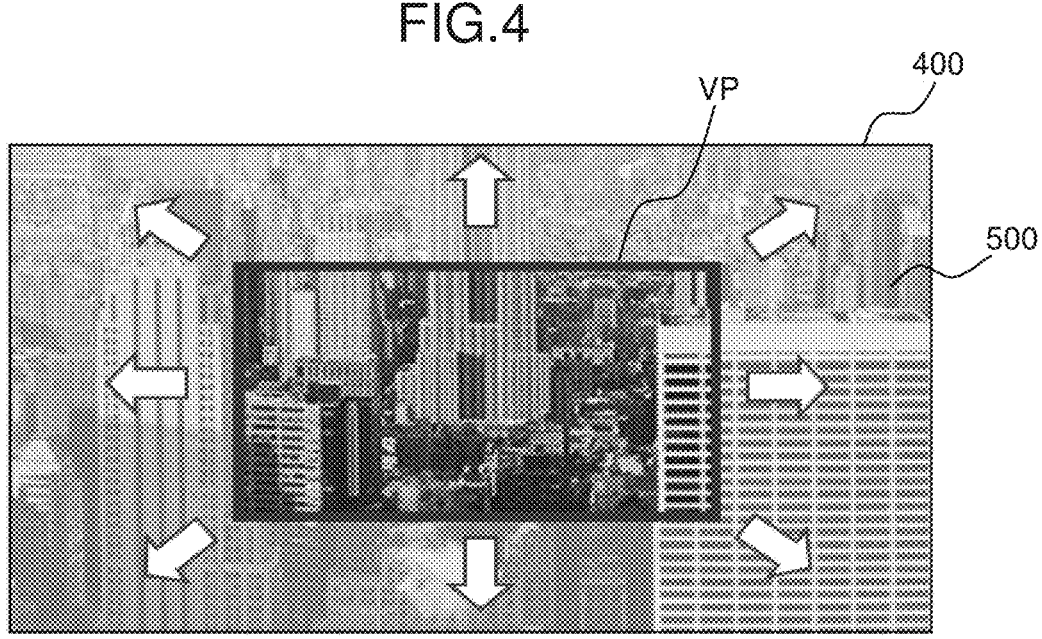
FIG. 5 shows an exemplary tile comprising a viewport according to the present principles.
Figure 6:
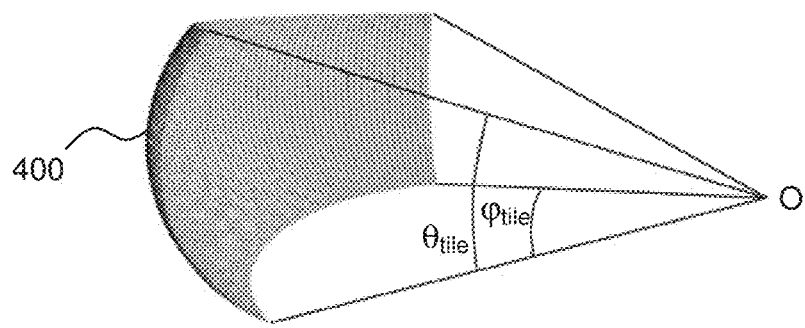
FIG. 6 show an exemplary tile of the set of tiles covering the spherical video of FIG. 4, in accordance with the present principles.

According to the present principles, as shown in the FIG. 4, in a tiled-based video service, the immersive video can be spatially sliced into a set of tiles 400 at the server side. The set of tiles covers the whole scene 500 of the immersive video. As shown in FIGS. 5 and 6, the size of the tiles 400 can be defined large enough to allow a variation of the focusing point without being forced to obtain and decode instantaneously another tile. In particular, in the following, it is assumed that one tile delivered to the terminal 100 can cover at least the part of scene 500 to be displayed through the viewport VP associated with the client terminal 100 requesting the immersive video. Naturally, in a variant or complement compliant with the present principles, when tiles are smaller than the viewport VP, several tiles might be needed to obtain the part of the scene displayed through the viewport VP.

While not mandatory, it is further assumed that an overlap exists between consecutive tiles 400 of the set of tiles. In addition, while a tile of rectangular shape has been illustrated in FIG. 4, the present principles can naturally be applied to any other type of tile shape.

Figure 7:
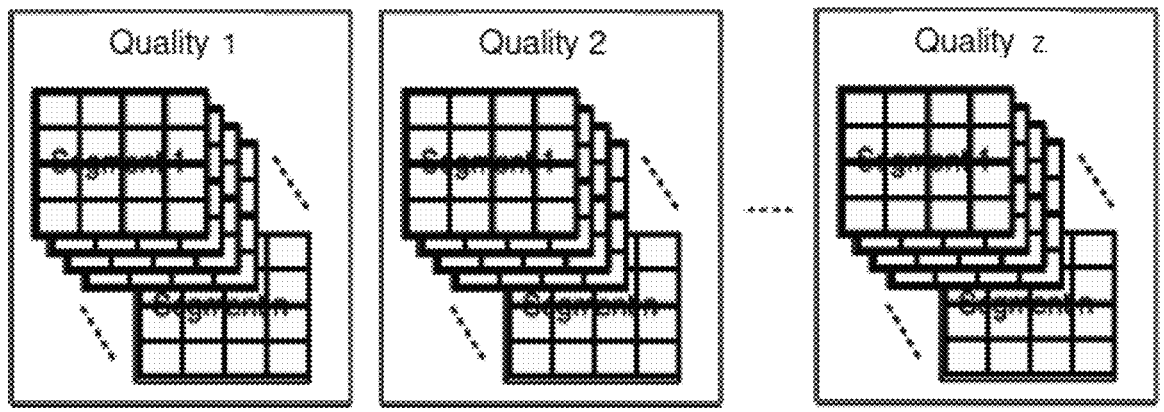
FIG. 7 schematically depicts a set of video segments and tile segments for different available representations of a tiled-based immersive video formatted for adaptive streaming, according to the present principles.

In the example of adaptive streaming, the immersive video is temporally divided into a plurality of video segments of equal duration, each video segment being available at different video qualities or bit rates (also called representations) at the server 300, as shown in FIG. 7. While it may be different, it is assumed that all the video segments of the immersive video are of equal duration.

In FIG. 7, for all the available video qualities (Quality 1, Quality 2, . . . , Quality z), each video segment 1 to n of the immersive video is spatially split in tiles 400 (each tile covering a portion of the immersive scene as illustrated in FIG. 4) according to the same tile arrangement. Each video segment is then defined by a set of tile segments of the same duration to cover the whole spherical scene (each tile segment being available at said different video qualities). Every tile segment—comprising a plurality of coded video frames—is of equivalent duration (e.g. 0.5 second).

Figure 8:
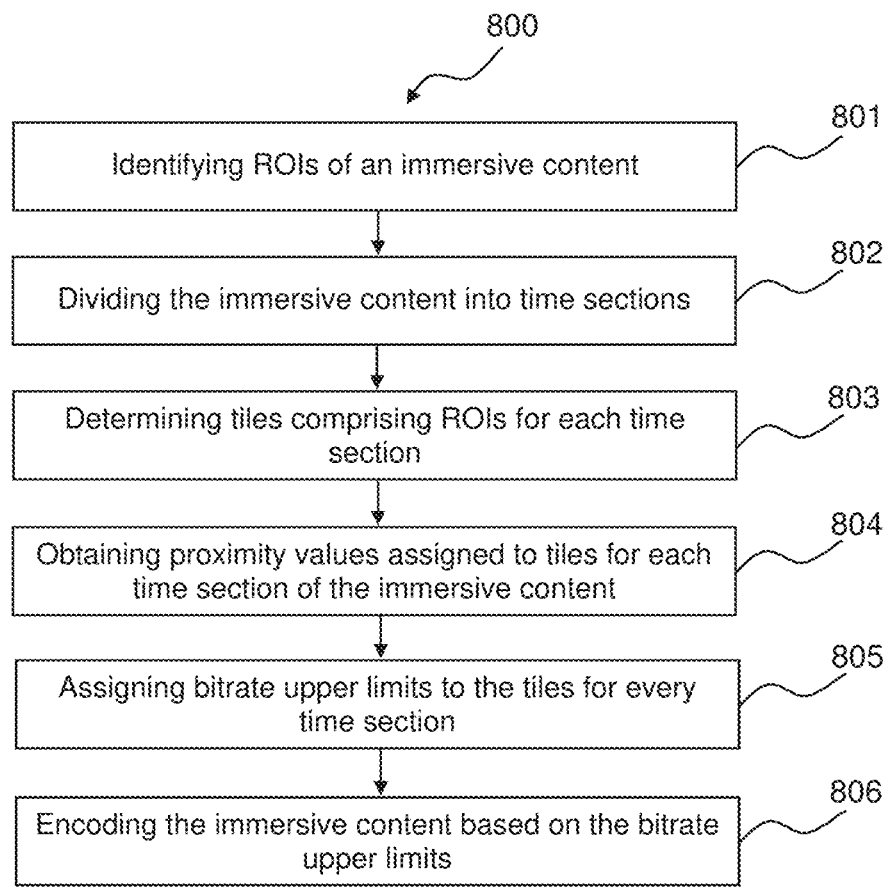
FIG. 8 is a flow chart of an exemplary method used by some embodiments of the present principles for encoding an immersive video.

According to the present principles, as shown in FIG. 8, the encoder 310 can be configured to implement (for instance via its content generator 315 and/or processors 313) a method 800 for encoding an immersive video spatially tiled with a set of tiles, said immersive video being encoded in one or more representations.

In a preliminary step 801, Region Of Interests (so called ROI) 600 of the immersive video are identified either automatically or manually. In particular, the ROIs 600 can be identified with determination of their location (i.e. their coordinates within the scene) as follows:
- the ROIs can be part of the scenario and predefined by the content producer;
- the immersive video can be tested on a user's panel, who will indicate what they consider as ROIs;

the ROIs can be automatically computed or determined with any known image processing methods.

It should be noted that a Region Of Interest can, for instance, be defined as a part of video images that will catch end-users attention (such as action place with movement, color, light character, sounds, etc., attracting the end-users).

Since it is highly likely that the ROIs 600 will move within the scene and change over time, the immersive video is divided into time sections in a step 802. The shorter the duration of a time section is, the better the benefits in terms of bandwidth and storage usage can be. Nevertheless, in order to optimize content preparation speed, a content producer can decide to increase the time section duration. It should be further noted that the chosen time section is a multiple of a segment duration.

Once the ROIs' coordinates are obtained (step 801) for each time section of the immersive video, the encoder 310 can determine (step 803) the tiles 400 comprising the ROIs 600 for each time section, from the tiles position and ROI's coordinates. It has to be noted that a ROI 600 of a time section can be covered by one or more tiles depending on its definition, its size, the tiles type and the tiles size. Several ROIs 600 can further co-exist in a same time section.

Figure 9:
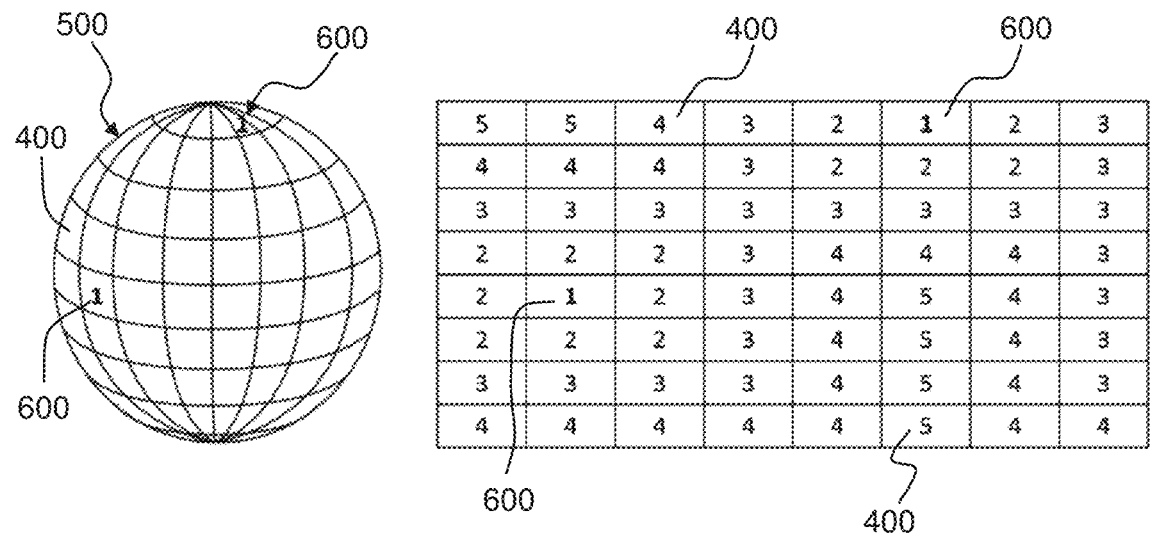
FIG. 9 shows an example of proximity value allocation, compliant with the present principles.

In the illustrative but non-limiting example of FIG. 9 representing an equirectangular projection of the spherical scene of an immersive video, two ROIs 600 are represented for a given time section. While it might be different, in this example, each ROI is covered by a single tile 400.

The encoder 310 can determine (step 804) a proximity value to be associated with the tile 400, in order to further assign (step 805) which video quality will be assigned to a given tile 400 of the set of tiles for a time section. Such a proximity value can represent a proximity of a tile 400 with a ROI 600. The proximity value can for instance correspond (but not necessary) to a number of tiles between a considered tile 400 and its closest ROI 600. In a variant compliant with the present principles, the proximity value can be determined from a distance between a center of the given tile and a center of the considered region of interest. For example, in case of a spherical scene of the immersive video as shown in FIG. 4, the Haversine formula allows to determine the distance between the center of a tile and the center of the ROI (e.g. the center of the tile comprising the ROI can be considered).

According to such definitions (number of tiles or distance), the proximity value is inversely proportional to the distance separating a given tile and a ROI tile.

In the illustrative example FIG. 9, two ROIs 600 are present in the immersive video for a given time section. Each tile 400 comprising a ROI 600 (hereinafter called containing tile or ROI tile) is assigned a proximity value equal to 1. The tiles 400 in the immediate surroundings of the ROI tiles (i.e. the contiguous tiles) are assigned a proximity equal to 2 (i.e. the proximity value is incremented by 1). In a variant or complement, the proximity value of tiles in the immediate surrounding of the ROI tiles can be equal to the proximity value of the ROI tiles, especially when the viewport is covered by several tiles. This operation is repeated for the tiles 400 in the immediate surroundings of the tiles having a proximity value equal to 2, which are assigned a proximity value equal to 3. The operation for assigning a proximity value (which is launched from the ROI tile(s)) is repeated until all tiles 400 of the set of tiles covering the scene have been assigned a proximity value.

It should be noted that, as shown in the example of FIG. 9, in case of more than one ROI tile, the proximity value assigned to a given tile 400 is determined based on its closest ROI tile (especially when two proximity values for a given tile are possible, the highest or best proximity being then considered).

The determination of the proximity values assigned to the tiles 400 of the set of tiles is repeated for each time section of the immersive video. When assuming that the set of proximity values for a time section defines a proximity map, several proximity maps are then associated with the whole immersive video.

In a variant or complement compliant with the present principles shown in FIG. 10, the most likely path 700 (hereinafter named linking path) a user's aiming point is prone to follow between two ROIs 600 during a given time section can be predicted or estimated (e.g. the linking path can correspond to a straight line on the sphere, so called orthodromic distance). The user can be encouraged to follow such a linking path 700 between ROIs 600, for instance, by means of user interface tools (such as directional arrows or the like) not shown in the Figures.

Figure 10:
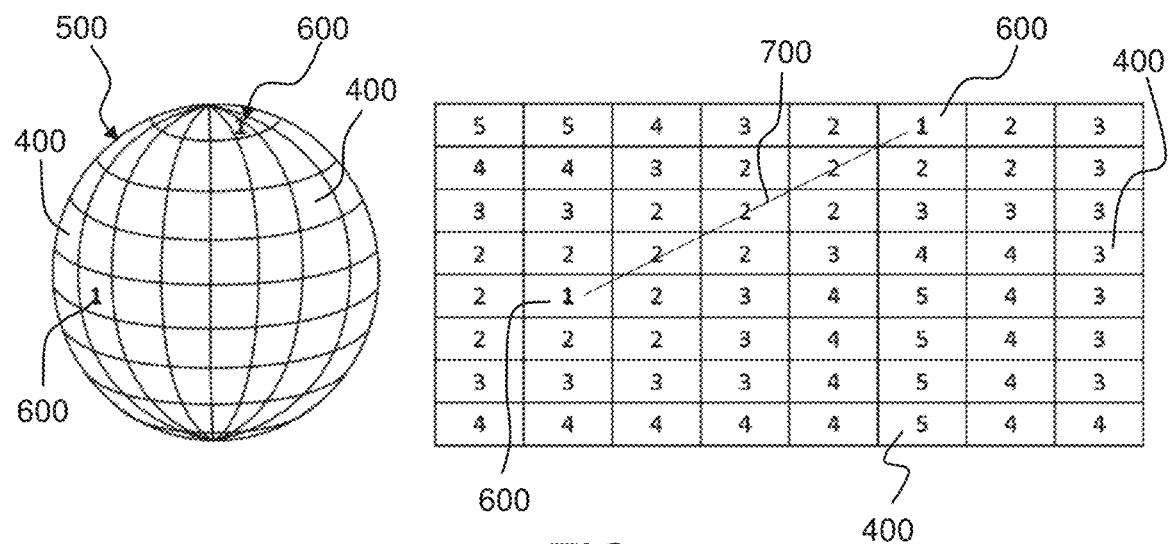
FIG. 10 shows another example of proximity value allocation, compliant with the present principles.

As shown in the FIG. 10, the proximity values assigned to the tiles 400 covering or close to the linking path 700 can be set to a given value (equal to 2 in the example) in order to ensure a given video quality level for the tiles 400 on or around the linking path 700 (i.e. the video quality is at most equal to a chosen quality level).

While in the example of FIG. 9 some tiles 400 on or surrounding the liking path 700 have been assigned a proximity value equal to 3, their proximity value is switched to 2 when implementing the variant or complement of FIG. 10. The proximity values of the tiles surrounding the tiles on or around the linking path 700 are modified accordingly to comply with the determination process defined in relation to FIG. 9.

In a further step 806, the encoder 310 can encode the immersive content according to an encoding strategy assigning a bit-rate upper limit to each proximity value of each proximity map. In an embodiment of the present principles, the bit-rate upper limit assigned to a proximity value corresponds to the maximum encoding video quality (or bit-rate) allowed.

With reference to the illustrative example of FIG. 9, the bit-rate allocation can be set as follows:

- a bit-rate upper limit equal to 25 Mb/s (i.e. a very high video quality) is assigned to the proximity value 1;
- a bit-rate upper limit equal to 22 Mb/s (i.e. a high video quality) is assigned to the proximity value 2;
- a bit-rate upper limit equal to 20 Mb/s (i.e. a "high" medium video quality) is assigned to the proximity value 3;
- a bit-rate equal to 18 Mb/s (i.e. a "low" medium video quality) is assigned to the proximity value 4;
- a bit-rate upper limit equal to 15 Mb/s (i.e. a low video quality) is assigned to the proximity value 5.

In such case, the bitrate upper limit assigned to a tile is inversely proportional to the corresponding proximity value.

It has to be understood that the bit-rate allocation can be adapted according to the level number of proximity values. In addition, a same bit-rate upper limit can be used for close proximity values.

The encoder 310 can launch the encoding operation based on allocated bit-rates. Each tile segment of a video segment is then encoded with one or more qualities, in accordance with its allocated bit-rate upper limit previously defined.

In the illustrative example of FIG. 9, for a tile 400 having a proximity value equal to 2 during a given time section, four representations will be encoded with a corresponding bit-rate equal to 22 Mb/s, 20 Mb/s, 18 Mb/s and 15 Mb/s respectively. By contrast, for a tile 400 having a proximity value equal to 4, only two representations will be encoded by the content server with a corresponding bit-rate equal to 18 Mb/s and 15 Mb/s respectively.

Besides, in the illustrative but non-limitative example of the MPEG-DASH protocol, the available representations for a tile 400 for each time section of an immersive video as determined according to the method 800 can be described in a corresponding Media Presentation Description (MPD) file which describes a manifest of the available content, its various alternatives, their URL addresses, and other characteristics.

From the information embedded in the MPD file, the client terminal 100—configured to receive and interpret the MPD file (e.g. via its streaming controller 103) received from the server 300 storing the encoded immersive video—can be aware of tiles quality availability to build its content requests accordingly.

An extract of an exemplary MPD used for tiles declaration (without implementation of the present principles) is shown in the following Table 1:

TABLE 1

MPD (extract) for tiles declaration

```
<MPD xmlns="urn:mpeg:dash:schema:mpd:2011"
    minBufferTime="PT1.500S" type="static"
    mediaPresentationDuration="PT0H1M49.000S"
    maxSegmentDuration="PT0H0M0.500S"
    profiles="urn:mpeg:dash:profile:full:2011">
  <EssentialProperty schemeIdUri="urn:mpeg:mpegI:omaf:2017:pf"
        projection_type="2" />
  <BaseURL>http://www.example.com/ContentName/</BaseURL>
  <Period duration="PT0H1M49.000S">
    <AdaptationSet mimeType="video/mp4" codecs="hev1.1.2.H150.0"
        width="3840" height="1960" frameRate="30"
        startWithSAP="1" segmentAlignment="true"
        bitstreamSwitching="true" sar="1:1">
      <!-- Tile 1 -->
      <SupplementalProperty
          schemeIdUri="urn:mpeg:mpegI:omaf:2017:cc"
          shape_type="2">
        <CoverageInfo center_azimuth="0"
            center_elevation="11468800"
            azimuth_range="7864320"
            elevation_range="4716364" />
      </SupplementalProperty>
      <SegmentTemplate
          initialization="SphericalTile_dash_init.mp4"
          media="$Bandwidth$/ContentName_tile1_$Number$.m4s"
          timescale="30000" startNumber="1" duration="15000"/>
      <Representation id="1" bandwidth="25000000"/>
      <Representation id="2" bandwidth="20000000"/>
      <Representation id="3" bandwidth="15000000"/>
      <Representation id="4" bandwidth="10000000"/>
      <Representation id="5" bandwidth="5000000/">
    </AdaptationSet>
    <!-- AdaptationSet for Tile 2 . . . -->
  </Period>
</MPD>
```

In a first embodiment compliant with the present principles, the MPD file groups bit-rates in categories. The categories are created to group similar bit-rates usages wherein each tile is present in every quality category. Within a given category, a tile is encoded according to the lowest bit-rate of:

the bit-rate announced for the representation associated with this category;

the bit-rate upper limit associated with the proximity value of this tile.

The categories are created as follows:

a category representing the best possible quality for all tiles, some other categories can be added to offer medium or low quality for all tiles.

The below exemplary Table 2 describes the three following groups of quality:

high group gathering bit-rates upper limits equal to 25 Mb/s, 22 Mb/s and 20 Mb/s;

medium group offering a bit-rate equal to 10 Mb/s;

low group offering a bit-rate equal to 5 Mb/s.

TABLE 2

MPD example (extract) for tiles declaration.

```
<MPD xmlns="urn:mpeg:dash:schema:mpd:2011"
    minBufferTime="PT1.500S" type="static"
    mediaPresentationDuration="PT0H1M49.000S"
    maxSegmentDuration="PT0H0M0.500S"
    profiles="urn:mpeg:dash:profile:full:2011">
  <EssentialProperty schemeIdUri ="urn:mpeg:mpegI:omaf:2017:pf"
        projection_type="2" />
  <BaseURL>http://www.example.com/ContentName/</BaseURL>
  <Period duration="PT0H1M49.000S">
    <AdaptationSet mimeType="video/mp4" codecs="hev1.1.2.H150.0"
        width="3840" height="1960" frameRate="30"
        startWithSAP="1" segmentAlignment="true"
        bitstreamSwitching="true" sar="1:1">
      <!-- Tile 1 -->
      <SupplementalProperty
          schemeIdUri="urn:mpeg:mpegI:omaf:2017:cc"
          shape_type"2">
        <CoverageInfo center_azimuth="0"
            center_elevation="11468800"
            azimuth_range="7864320"
            elevation_range="4716364" />
      </SupplementalProperty>
      <SegmentTemplate
          initialization="SphericalTile_dash_init.mp4"
          media="$Bandwidth$/ContentName_tile1_$Number$.m4s"
          timescale="30000" startNumber="1" duration="15000"/>
      <Representation id="high_group" bandwidth="25000000"/>
      <Representation id="medium_group" bandwidth="10000000"/>
      <Representation id="low_group" bandwidth="5000000"/>
    </AdaptationSet>
    <!-- AdaptationSet for Tile 2 . . . -->
  </Period>
</MPD>
```

In addition, an example of a GET request for a segment of the high group and number equal to 123, according to said first embodiment, is shown hereinafter:

GET ContentName/25000000/ContentName_tile1_123.m4s HTTP/1.1

Host: www.example.com

Connection: keep-alive

User-Agent: Mozilla/5.0 (Windows NT 6.1; Win64; x64) AppleWebKit/537.36 (KHTML, like Gecko) Chrome/60.0.3112.113 Safari/537.36

Accept:video/h264;q=0.9,video/*;q=0.8

In a second embodiment compliant with the present principles, the MPD file can list the time sections dividing the immersive video. For each time section a <Period> field is defined wherein each tile and its associated representation(s) are described. The below exemplary Table 3 describes two time sections of the immersive video, represented by two <Period> fields. For the first <Period> field, the Tile 1 is available in five representations (at respectively 25 Mb/s, 20 Mb/s, 15 Mb/s, 10 Mb/s, 5 Mb/s), whereas, for the second <Period> field, only four representations (respectively 20 Mb/s, 15 Mb/s, 10 Mb/s, 5 Mb/s) are available.

TABLE 3

MPD (extract) for tiles declaration using Period field.

```
<MPD xmlns="urn:mpeg:dash:schema:mpd:2011"
      minBufferTime="PT1.500S" type="static"
      mediaPresentationDuration-"PT0H1M49.000S"
      maxSegmentDuration="PT0H0M0.500S"
      profiles="urn:mpeg:dash:profile:full:2011">
  <EssentialProperty schemeIdUri="urn:mpeg:mpegI:omaf:2017:pf"
      projection_type="2"/>
  <BaseURL>http://www.example.com/ContentName/</BaseURL>
  <Period duration="PT0H0M1.000S">
    <AdaptationSet mimeType="video/mp4" codecs="hev1.1.2.H150.0"
        width="3840" height="1960" frameRate="30"
        startWithSAP="1" segmentAlignment=true"
        bitstreamSwitching="true" sar="1:1">
      <!-- Tile 1 -->
      <SupplementalProperty
          schemeIdUri="urn:mpeg:mpegI:omaf:2017:cc"
          shape type="2">
        <CoverageInfo center_azimuth="0"
            center_elevation="11468800"
            azimuth_range="7864320"
            elevation_range="4716364" />
      </SupplementalProperty>
      <SegmentTemplate
          initialization="SphericalTile_dash_init.mp4"
          media="$Bandwidth$/ContentName_tile1_$Number$.m4s"
          timescale="30000" startNumber="1" duration="15000"/>
      <Representation id="1" bandwidth="25000000"/>
      <Representation id="2" bandwidth="20000000"/>
      <Representation id="3" bandwidth="15000000"/>
      <Representation id="4" bandwidth="10000000"/>
      <Representation id="5" bandwidth="5000000"/>
    </AdaptationSet>
    <!-- AdaptationSet for Tile 2 . . . -->
  </Period>
  <Period duration="PT0H0M1.000S">
    <AdaptationSet mimeType="video/mp4" codecs="hev1.1.2.H150.0"
        width="3840" height="1960" frameRate="30"
        startWithSAP="1" segmentAlignment="true"
        bitstreamSwitching="true" sar="1:1">
      <!-- Tile 1 -->
      <SupplementalProperty
          schemeIdUri="urn:mpeg:mpegI:omaf:2017:cc"
          shape type="2">
        <CoverageInfo center_azimuth="0"
            center_elevation="11468800"
            azimuth_range="7864320"
            elevation_range="4716364" />
      </SupplementalProperty>
      <SegmentTemplate
          initialization="SphericalTile_dash_init.mp4"
          media="$Bandwidth$/ContentName_tile1_$Number$.m4s"
          timescale="30000" startNumber="3" duration="15000"/>
      <Representation id="2" bandwidth="20000000"/>
      <Representation id="3" bandwidth="15000000"/>
      <Representation id="4" bandwidth="10000000"/>
      <Representation id="5" bandwidth="5000000"/>
    </AdaptationSet>
    <!-- AdaptationSet for Tile 2 . . . -->
  </Period>
  <!-- Period 3. . . -->
</MPD>
```

In a third embodiment compliant with the present principles, the MPD file can describe the exact tile availability for each quality. In a MPD file, each <AdaptationSet.Representation> field represents a quality for a tile. By using the <SegmentTimeline> field, we can describe precisely the segment availability for this tile. The segments are identified either by their segment number, either by their time.

In this third embodiment, the Tile 1—which is available in 25 Mb/s and 20 Mb/s for only some time sections of the immersive video—is described. The below exemplary Table 4 describes two different examples of implementation relying on the <SegmentTimeline> field:

- the first implementation of the <SegmentTimeline> field uses time to describe the related segments;
- the second (subsequent) implementation of the <SegmentTimeline> field uses segments number to describe the related segments.

TABLE 4

MPD (extract) for tiles declaration using segment timeline element.

```
<MPD xmlns="urn:mpeg:dash:schema:mpd:2011"
      minBufferTime="PT1.500S" type="static"
      mediaPresentationDuration="PT0H1M49.000S"
      maxSegmentDuration="PT0H0M0.500S"
      profiles="urn:mpeg:dash:profile:full:2011">
  <EssentialProperty schemeIdUri="urn:mpeg:mpegI:omaf:2017:pf"
      projection_type="2" />
  <BaseURL>http://www.example.com/ContentName/</BaseURL>
  <Period duration="PT0H1M49.000S">
    <AdaptationSet mimeType="video/mp4"codecs="hev1.1.2.H150.0"
        width="3840" height="1960" frameRate="30"
        startWithSAP="1" segmentAlignment="true"
        bitstreamSwitching="true" sar="1:1">
      <!-- Tile 1 -->
      <SupplementalProperty
          schemeIdUri="urn:mpeg:mpegI:omaf:2017:cc"
          shape type="2">
        <CoverageInfo center_azimuth="0"
            center_elevation="11468800"
            azimuth_range="7864320"
            elevation_range="4716364" />
      </SupplementalProperty>
      <SegmentTemplate
          initialization="SphericalTile_dash_init.mp4"/>
      <Representation id="1" bandwidth="25000000">
        <SegmentTemplate
            timescale="30000"
            media="$Bandwidth$/
            ContentName_tile1_$Time$.m4s">
          <SegmentTimeline>
            <S d="15000" t="0" r="3"/>
            <S d="15000" t="150000" r="10"/>
          </SegmentTimeline>
        </SegmentTemplate>
      </Representation>
      <Representation id="2" bandwidth="20000000">
        <SegmentTemplate
            timescale="30000"
            media="$Bandwidth$/
            ContentName_tile1_$Number$.m4s">
          <SegmentTimeline>
            <S d="15000" n="1" r="3"/>
            <S d="15000" n="10" r="10"/>
          </SegmentTimeline>
        </SegmentTemplate>
      </Representation>
    </AdaptationSet>
    <!-- Other tiles -->
  </Period>
</MPD>
```

Thanks to the above described method, the encoding of different representations (qualities) of the tiles is performed by the encoder based on user's interest. This leads to a reduction of the required storage size on disk at the server side (as some representations are not encoded), reducing the storage issue for adaptive streaming of high-quality content (such as immersive content). The entire immersive video may not be distributed in the highest allowed quality. As a consequence, the available network usage and bandwidth delivery can be improved, by focusing available bandwidth for the most interesting video parts.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the method and device described. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

Although certain embodiments only of the disclosure have been described herein, it will be understood by any person skilled in the art that other modifications, variations, and possibilities of the disclosure are possible. Such modifications, variations and possibilities are therefore to be considered as falling within the spirit and scope of the disclosure and hence forming part of the disclosure as herein described and/or exemplified.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

The invention claimed is:

1. A method of encoding an immersive video spatially tiled with a set of tiles, each tile covering a spatial portion of a scene of the immersive video, the method comprising:
   identifying a region of interest within the scene;
   obtaining, for each time section among a set of time sections temporally dividing the immersive video, proximity values associated with the set of tiles, wherein each proximity value of the proximity values represents a distance between the region of interest and a corresponding tile of the set of tiles;
   assigning a bit-rate upper limit to each proximity value of the proximity values and encoding, for each time section, each tile of the set of tiles according to the assigned bit-rate upper limit associated with a respective tile's corresponding proximity value; and
   wherein, for at least a subset of the set of tiles, wherein the subset corresponds to a viewport for the immersive video, a first tile of the subset is encoded according to a first assigned bit-rate upper limit and a second tile of the subset is encoded according to a second assigned bit-rate upper limit, and wherein the first assigned bit-rate upper limit is different from the second assigned bit-rate upper limit.

2. The method according to claim 1, wherein the distance between the corresponding tile and the region of interest corresponds to a number of tiles between the corresponding tile and the region of interest.

3. The method according to claim 1, wherein the distance between the corresponding tile and the region of interest is a distance between a center of the corresponding tile and a center of the region of interest.

4. The method according to claim 1, wherein, when at least two regions of interest are present in the scene for a given time section, a given proximity value assigned to a given tile is obtained from a closest region of interest to the given tile.

5. The method according to claim 1, wherein each bit-rate upper limit assigned to a given proximity value of a given tile corresponds to a maximum encoding video quality allowed for the given tile.

6. The method according to claim 1, further comprising determining a linking path between two regions of interest and assigning a proximity value associated with a video quality level to two or more tiles of the set of tiles on the linking path.

7. A method comprising receiving, at a terminal, the immersive video; and receiving, from network equipment, a media presentation description file associated with the immersive video and describing available representations of tile segments for a set of time sections temporally dividing the immersive video encoded according to the method of claim 1.

8. A terminal comprising a receiver configured to receive, from network equipment, the immersive video; and at least one interface of connection configured to receive a media presentation description file associated with the immersive video and describing available representations of tile segments for a set of time sections temporally dividing the immersive video encoded according to the method of claim 1.

9. The method of claim 1, wherein the encoding further comprises encoding one or more representations of a first tile of the set of tiles, wherein the first tile has a first proximity value of the proximity values, wherein each representation of the one or more representations is encoded at a different bit-rate, and wherein a quantity of the one or more representations that is encoded for the first tile is based on the first proximity value.

10. The method of claim 1, wherein, for at least a second subset of the set of tiles, wherein the second subset corresponds to tiles outside the viewport for the immersive video, each tile of the second subset of tiles is encoded according to the assigned bit-rate upper limit associated with the tile's corresponding proximity value.

11. An encoder configured to encode an immersive video spatially tiled with a set of tiles, each tile covering a spatial portion of a scene of the immersive video, wherein the encoder comprises:

one or more memories including instructions that cause one or more processors to:
identify a region of interest within the scene;
obtain, for each time section among a set of time sections temporally dividing the immersive video, proximity values associated with the set of tiles, wherein each proximity value of the proximity values represents a distance between the region of interest and corresponding tile of the set of tiles;
assign a bit-rate upper limit to each proximity value of the proximity values and encode, for each time section, each tile of the set of tiles according to the assigned bit-rate upper limit associated with a respective tile's corresponding proximity value; and
wherein, for at least a subset of the set of tiles, wherein the subset corresponds to a viewport for the immersive video, a first tile of the subset is encoded according to a first assigned bit-rate upper limit and a second tile of the subset is encoded according to a second assigned bit-rate upper limit, and wherein the first assigned bit-rate upper limit is different from the second assigned bit-rate upper limit.

12. The encoder according to claim 11, wherein the distance between the corresponding tile and the region of interest corresponds to a number of tiles between the corresponding tile and the region of interest.

13. The encoder according to claim 11, wherein the distance between the corresponding tile and the region of interest is a distance between a center of the corresponding tile and a center of the region of interest.

14. The encoder according to claim 11, wherein each bit-rate upper limit assigned to a given proximity value of a given tile corresponds to a maximum encoding video quality allowed for the given tile.

15. The encoder according to claim 11, wherein the one or more processors are further configured to determine a linking path between two regions of interest and assign a proximity value associated with a video quality level to two or more tiles of the set of tiles on the linking path.

16. The encoder of claim 11, wherein the encoding further comprises encoding one or more representations of a first tile of the set of tiles, wherein the first tile has a first proximity value of the proximity values, wherein each representation of the one or more representations is encoded at a different bit-rate, and wherein a quantity of the one or more representations that are encoded for the first tile is based on the first proximity value.

17. A non-transitory computer readable medium readable by at least one of a computer and a processor and comprising program code instructions for performing a method of encoding an immersive video spatially tiled with a set of tiles, each tile covering a spatial portion of a scene of the immersive video, the method comprising:

identifying a region of interest within the scene;
obtaining, for each time section among a set of time sections temporally dividing the immersive video, proximity values associated with the set of tiles, wherein each proximity value of the proximity values represents a distance between the region of interest and a corresponding tile of the set of tiles;
assigning a bit-rate upper limit to each proximity value of the proximity values and encoding, for each time section, each tile of the set of tiles according to the assigned bit-rate upper limit associated with a respective tile's corresponding proximity value; and
wherein, for at least a subset of the set of tiles, wherein the subset corresponds to a viewport for the immersive video, a first tile of the subset is encoded according to a first assigned bit-rate upper limit and a second tile of the subset is encoded according to a second assigned bit-rate upper limit, and wherein the first assigned bit-rate upper limit is different from the second assigned bit-rate upper limit.

18. The non-transitory computer readable medium of claim 17, wherein the encoding further comprises encoding one or more representations of a first tile of the set of tiles, wherein the first tile has a first proximity value of the proximity values, wherein each representation of the one or more representations is encoded at a different bit-rate, and wherein a quantity of the one or more representations that are encoded for the first tile is based on the first proximity value.

19. A non-transitory program storage device readable by a computer and storing a program of instructions executable by the computer to perform a method of encoding an immersive video spatially tiled with a set of tiles, each tile covering a spatial portion of a scene of the immersive video, the method comprising:

identifying a region of interest within the scene;
obtaining, for each time section among a set of time sections temporally dividing the immersive video, proximity values associated with the set of tiles, wherein each proximity value of the proximity values represents a distance between the region of interest and a corresponding tile of the set of tiles;
assigning a bit-rate upper limit to each proximity value of the proximity values and encoding, for each time section, each tile of the set of tiles according to the assigned bit-rate upper limit associated with a respective tile's corresponding the proximity value; and
wherein, for at least a subset of the set of tiles, wherein the subset corresponds to a viewport for the immersive video, a first tile of the subset is encoded according to a first assigned bit-rate upper limit and a second tile of the subset is encoded according to a second assigned bit-rate upper limit, and wherein the first assigned bit-rate upper limit is different from the second assigned bit-rate upper limit.

20. The non-transitory program storage device of claim 19, wherein the encoding further comprises encoding one or more representations of a first tile of the set of tiles, wherein the first tile has a first proximity value of the proximity values, wherein each representation of the one or more representations is encoded at a different bit-rate, and wherein a quantity of the one or more representations that are encoded for the first tile is based on the first proximity value.

* * * * *